Feb. 17, 1948. S. M. ABBOTT 2,436,030
LIQUID DISPENSER
Filed Feb. 14, 1944 3 Sheets-Sheet 1
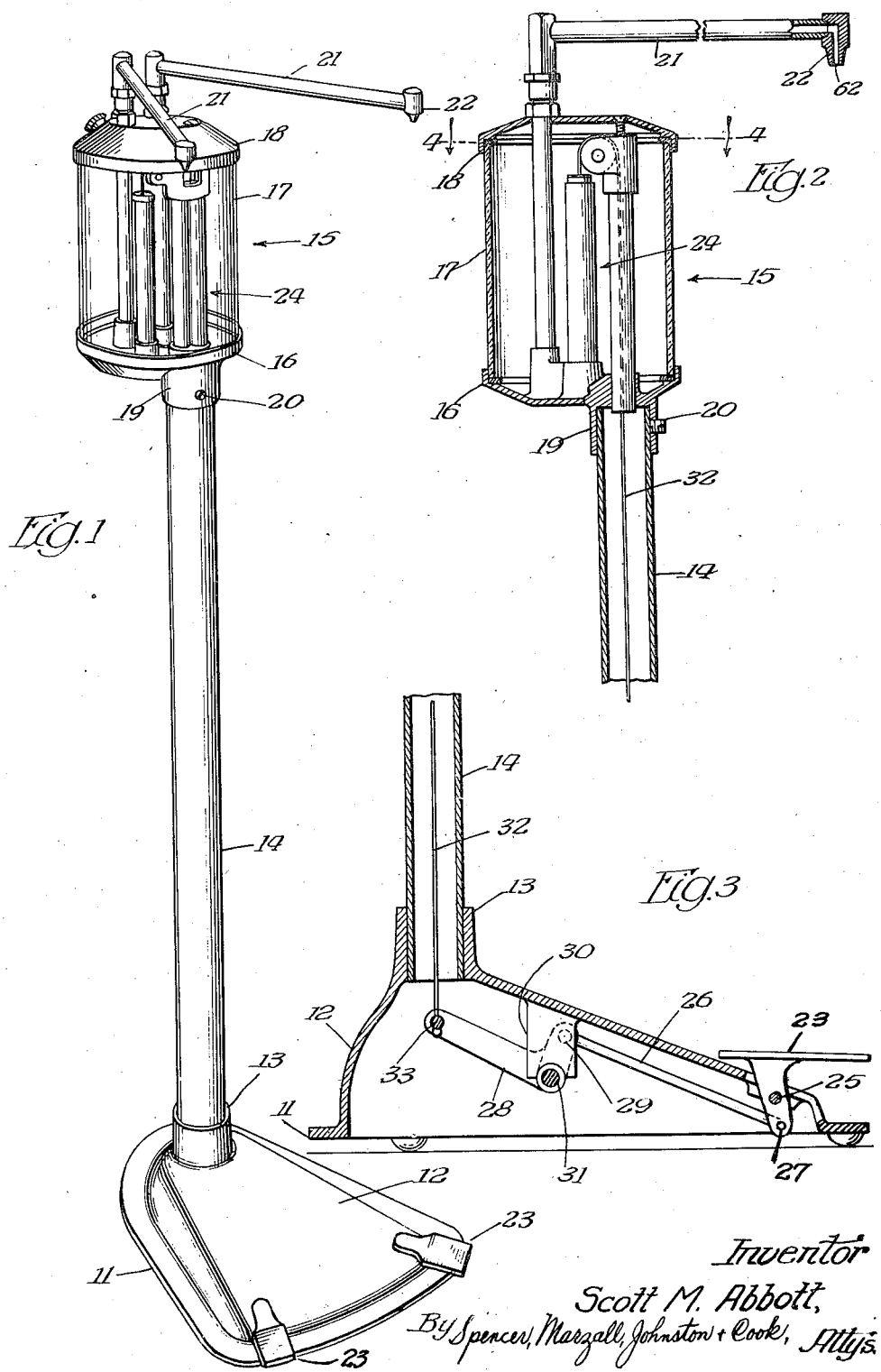
Inventor
Scott M. Abbott,
By Spencer, Marzall, Johnston & Cook, Attys.

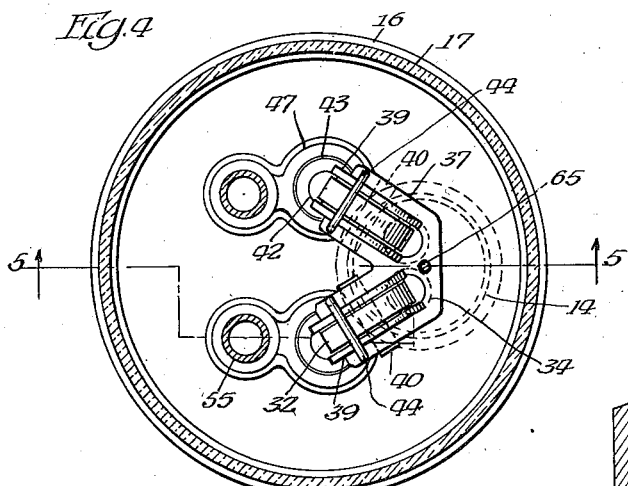
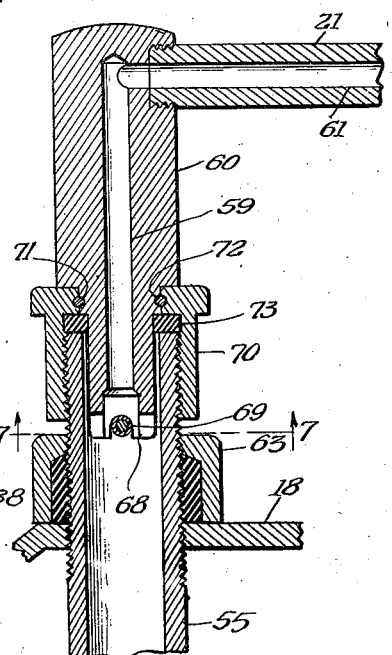
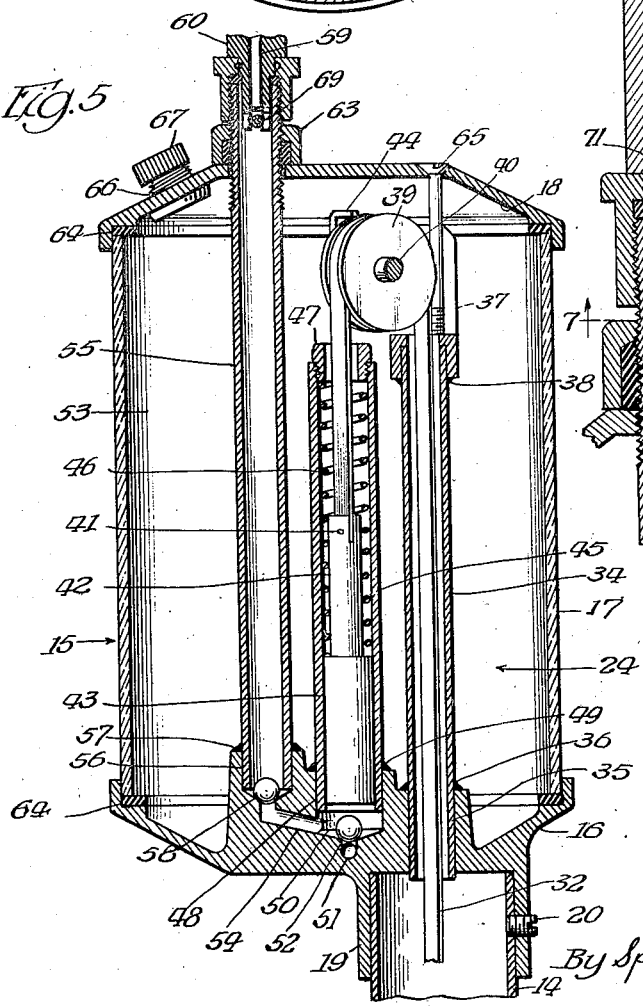
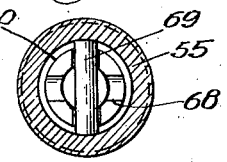

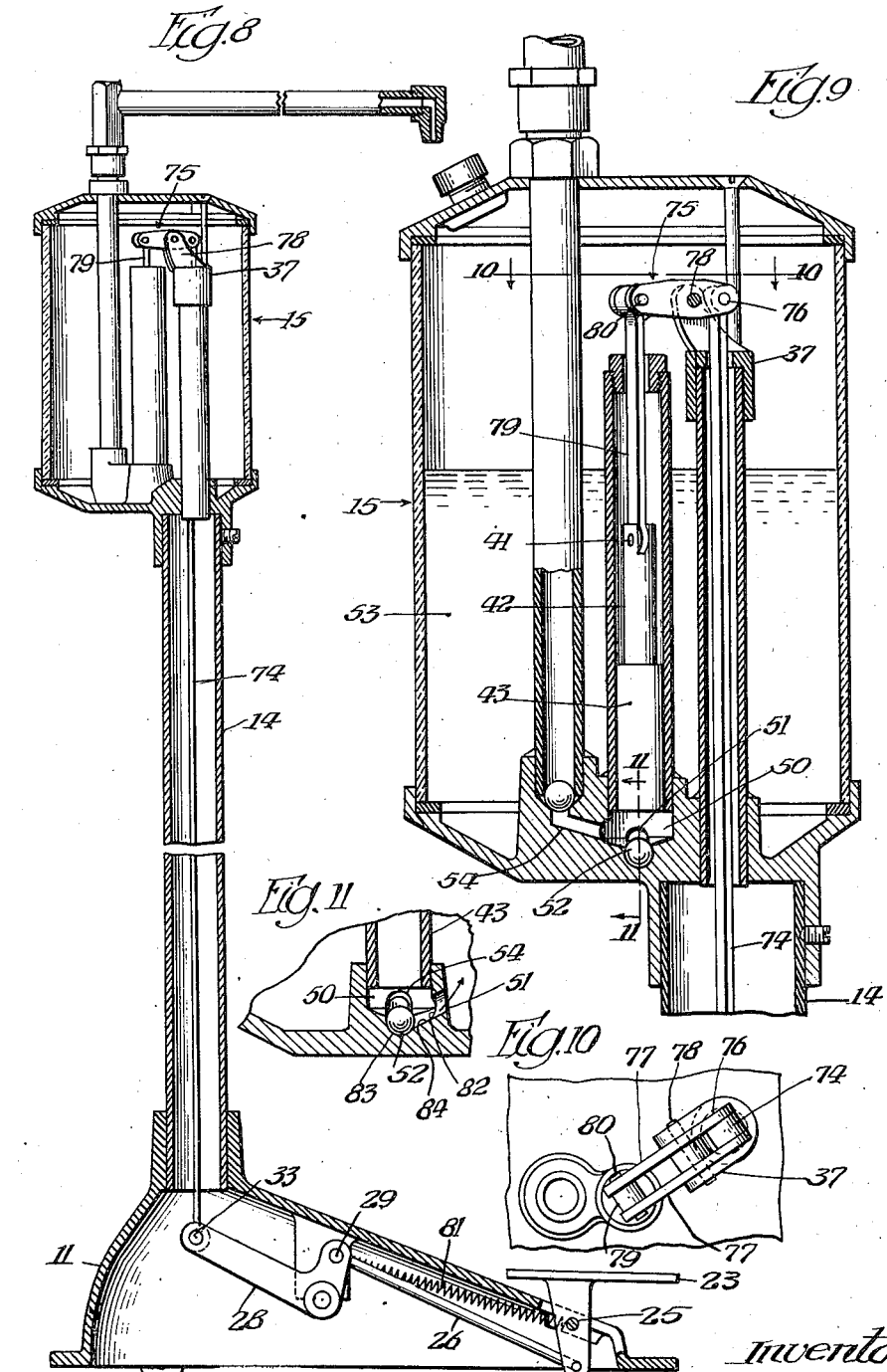

Patented Feb. 17, 1948

2,436,030

UNITED STATES PATENT OFFICE 2,436,030

LIQUID DISPENSER

Scott M. Abbott, Chicago, Ill., assignor to Ralph C. Burrows, Park Ridge, Ill.

Application February 14, 1944, Serial No. 522,267

11 Claims. (Cl. 222—179)

This invention relates to liquid dispensers, and the principal object of the invention is to provide a liquid soap and alcohol dispenser wherein a discharge tube may be shifted to any one of a number of pre-selected positions and then locked in such pre-selected positions, whereby the discharge tube may be adjusted to an advantageous position, but accidental contact therewith will not move it from its pre-set position.

Numerous other objects and advantages will be apparent throughout the progress of the specification.

The accompanying drawings illustrate one embodiment of a device incorporating the features of the present invention, in which:

Fig. 1 is a perspective left front elevation;

Fig. 2 is a partial left elevational view with some of the parts broken away for the sake of clearness;

Fig. 3 is a detail sectional view through the base and the column of the device;

Fig. 4 is a detail sectional view on the line 4—4 of Fig. 2;

Fig. 5 is a detail sectional view of the liquid container and part of the column on the line 5—5 of Fig. 4;

Fig. 6 is an enlarged cross sectional view of the discharge tube showing its method of connection to the liquid container; and Fig. 7 is a detail sectional view on the line 7—7 of Fig. 6, and shows the lower end of the support for the liquid dispensing tubes and a co-operating pin.

Fig. 8 is a detail sectional view through an alternative form of the device;

Fig. 9 is a detail sectional view of the liquid container of the alternative form of the device;

Fig. 10 is a detail view on the line 10—10 of Fig. 9; and

Fig. 11 is a detail view on the line 11—11 of Fig. 9.

The particular device herein disclosed for the purpose of illustrating the invention is mounted upon a base 11 (Fig. 1) which is shown as a steel casting. The base 11 is irregularly shaped and has rounded corners and an irregular dome-shaped central portion 12. An integral collar 13 at the rear of the dome-shaped section 12 provides a snug mounting for a chromium plated steel tube 14 which acts as a support for the liquid container 15.

The liquid container 15 comprises a circular bottom section 16, which is preferably chromium plated, a cylindrical central section 17, which is preferably made of some transparent material such as glass or the like, and a circular top plate 18, which is preferably chromium plated. A collar 19, integral with the bottom plate 16, is provided to mount the entire liquid container to the top of the steel tube 14, where it is securely fastened with a set screw 20. Liquid dispensing tubes 21 are mounted upon the circular top plate 18 and are provided with discharge nozzles 22 through which the liquid may be dispensed.

Two foot pedals 23 are mounted in slotted openings at the forward edge of the irregular dome-shaped section 12 of the base 11 and are used to operate the pumps 24 (Fig. 2) which are located within the liquid container 15. Each foot pedal 23 (Fig. 3) is provided with a fulcrum 25 and, when depressed, moves a connecting link 26 rearwardly. One end of each connecting link 26 is fastened to the lower end of each foot pedal 23 with a pin 27, and the other end of each is fastened to one of two bell cranks 28 with a pin 29. Each bell crank 28 is fulcrumed at the lower end of one of two downwardly depending sections 30 of the irregular dome-shaped section 12 upon a shaft 31. When each connecting link 26 is moved rearwardly by the depression of its foot pedal 23, the movement is transmitted to its bell crank 28, moving it counter-clockwise and lowering one of two flexible steel tapes 32, the lower end of each being secured to each bell crank 28 with a suitable fastener 33. The upper end of each flexible steel tape 32 (Fig. 5) is threaded through its own tube 34, which is preferably inserted in a circular opening 35 in the bottom plate 16 of the liquid container 15. Each tube 34 is rigidly mounted within the circular opening 35 by means of a welded joint 36. An irregular shaped casting 37 is mounted at the top of the two tubes 34, being secured with welded joints 38, and provides a mounting for two pulleys 39 journaled upon axles 40. The upper end of each steel tape 32 passes over its pulley 39 and then downwardly, where each is connected with a pin 41 to the upper narrow portion 42 of one of two pump pistons 43. An inverted U-shaped guard 44 is provided over each pulley 39 to maintain each flexible steel tape 32 upon the pulley.

Each pump piston 43 is reciprocably mounted within the pump barrel 45 and is urged downwardly by a spring 46, the upper end of which is maintained by a collar 47 threaded into the upper end of the pump barrel 45. Each pump barrel 45 is inserted in a circular opening 48 in the bottom plate 16, where it is maintained by a welded joint 49, and communicates with one of two chambers 50 in the bottom plate 16. Each chamber 50 is cylindrically shaped with a wide angle funnel-shaped lower portion which communicates with an inlet passage 51 leading from the interior of the liquid container 15. A ball check valve 52 in each chamber 50 seals it from the passage 51 upon downward strokes of the pump piston 43. As the pump piston 43 is raised, liquid contained within the central opening 53 of the liquid container 15 is drawn up through inlet passage 51 past ball check valve 52 and into chamber 50. The spring 46 lowers piston 43 and applies pressure to the liquid in chamber 50, closing the ball check valve 52, and forces the liquid out through one of the two discharge passages 54 into one of two riser tubes 55. Each riser tube 55 is inserted in a circular opening 56 in the circular bottom plate 16 and is maintained by a welded connection 57. A ball check valve 58 in the funnel-shaped bottom of each circular opening 56 prevents liquid returning to the chamber 50 through the discharge passage 54 when the pump piston 43 is raised. Fluid pumped into the riser tube 55 enters a passage 59 (Fig. 6) in a support 60 for the liquid dispensing tubes 21 and is exhausted through passage 61 in the liquid dispensing tubes and out of passage 62 (Fig. 2) in the discharge nozzles 22.

Through the mechanism before described the depression of each foot pedal 23 (Fig. 3) raises its respective pump piston 43 (Fig. 5) against the action of the spring 46. When the foot pedal 23 (Fig. 3) is released, the action of the spring 46 (Fig. 5) lowers the pump piston 43 and returns the foot pedal 23 (Fig. 3) to its initial position.

In addition to serving in the capacity as riser tubes, the riser tubes 55 (Fig. 5) provide the clamping means whereby the entire liquid container 15 is held together. The upper end of each riser tube 55 is threaded for a nut 63 which maintains the bottom plate 16, the central section 17, and the top plate 18 in an assembled relation. Gaskets 64 at the top and bottom of the central section prevent leakage of fluid between the central section and the top plate and between the central section and the bottom plate. Since the riser tubes 55 are offset from the center of the liquid container a screw 65, which engages with a threaded opening in the top of the irregular casting 37, co-operates with the riser tubes 55 to maintain the liquid container 15 in its assembled condition. Fluid may be inserted in the top of the liquid container 15 through an opening 66 closed by a knurled hand nut 67.

A novel feature of this liquid dispenser resides in the manner in which the dispensing tubes 21 are mounted to the liquid container 15 so that they may be secured in one of several pre-selected positions. To this end each support 60 (Fig. 6), to which the liquid dispensing tubes 21 are secured, is mounted upon one of the two riser tubes 55 with its lower reduced end inserted therein and is provided at its lower end with a plurality of U-shaped openings 68 (Fig. 7) adapted to engage a pin 69 (Fig. 6) securely fastened within the upper end of the riser tube 55. Thus, the support 60 may be set in any pre-selected position wherever the U-shaped openings 68 may embrace the pin 69. In order to maintain each support 60 in such pre-selected position, a nut 70 is secured to the support 60 by means of a ring 71 journaled in annular grooves 72 in the support 60 and the nut 70. The nut 70 mates with the threads in the upper portion of riser tube 55 and maintains the U-shaped openings 68 in contact with the pin 69. A gasket 73 prevents leakage at the joint between the upper end of the riser tube 55 and the nut 70. When it is desired to adjust the liquid dispensing tubes 21 to a new position, it is necessary only to loosen the nut 70, place the dispensing tube in its new pre-selected position, and then re-tighten the nut 70, thereby securely maintaining the device in any desired position.

The soap dispenser just described is particularly adaptable for use with liquids having a corrosive action upon ordinary pump parts. This is because the disclosed pump structure makes no use of glands and the like which are ordinarily quite susceptible to sticking and corrosion when used with corrosive liquids. In such case it is advisable that the pump parts be made of a metal which is resistant to such corrosive action. If such is done, however, it is frequently found to be impossible to find a suitable material for the spring 46, since corrosion resistant metals sometimes do not have the proper qualities needed for lasting spring action. Accordingly, an alternative construction is suggested wherein the spring 46 is so placed it will not come in contact with the fluid to be used in the container, preferably being placed outside of the soap container.

One such alternative construction is illustrated in this application and may use the same general construction features described above, with the exception that the flexible steep tape 32, the pulley 39, the axle 40, the guard 44, and the spring 46 are eliminated and the alternative structure is substituted.

In place of each steel tape 32, pulley 39 and axle 40, the alternative construction utilizes among other things a rigid steel rod 74, Fig. 8, the lower end of which is fastened to the bell crank 28 with the fastener 33. Each rod 74 extends upwardly within the tube 14 and has its upper end connected to one side of a crank 75 by means of a pin 76. Each crank 75 comprises two elongated members 77 maintained in spaced parallel relation, Fig. 10, and is pivotally mounted at the upper end of the casting 37 upon a pin 78. The other side of the crank 75 is connected to the upper end of a short rigid connecting link 79 with a pin 80, Fig. 9. The lower end of the link 79 is fastened to the upper portion 42 of the piston 43 with the pin 41.

The use of the rigid connections just described permits the removal of the spring 46 from a place in which it may come in contact with the liquid, and permits its replacement by a spring 81 having a similar function but located exteriorly of the liquid container 15. As illustrated, each spring 81 is mounted within the base 11 of the dispenser, Fig. 8. One end of each spring 81 is fastened to the pin 29 on each bell crank 28, and the other end is fastened to the fulcrum 25 for each foot pedal 23. Through the use of the described linkage, depression of the foot pedal 23 stretches the spring 81 and moves the link 26 to the left, the bell crank 28 in a counterclockwise direction, the rod 74 downwardly, the crank 75 in a clockwise direction, Fig. 9, the link 79 upwardly, and the piston 43 upwardly, thereby causing the inrush of fluid 53 into the chamber 50 of the pump. When the foot pedal 23 is released, then the spring 81 returns all of the operating mechanism to its initial position and expels the fluid from the chamber 50, out through the discharge passage 54, and thence out of the dispensing tubes as described before.

A feature of the alternative linkage over the flexible tape linkage, in addition to that of enabling the manufacture of a pump nearly corrosion proof, is the feature that the mechanical advantage between the movement of the foot pedal 23 and the piston 43 may be selected by the designer to his taste. It has been found, for instance, that an excellent location for the fulcrum pin 74 of the crank 75 is a position close to the pin 76 whereby the lever arm 76—78 is considerably shorter than the lever arm 78—80. Through this fulcrum arrangement short strokes of the pedal 23 produce full strokes of the piston 43 and the time required for each operation of the pump is reduced considerably.

The use of the alternative linkage further is very adaptable to the manufacture of the dispenser in quantity production since most of the new linkage may be made of inexpensive metal stampings, an important factor in reducing the cost per dispenser in quantity production.

One of the problems attendant the construction of a pump for liquid dispensers is the problem of sticking valves. Frequently the dispensers are not used for some time and the valves may become stuck in their seats, thereby preventing operation of the pump. This sticking may be eliminated by keeping the inlet valve away from its seat whenever the pump is not in use. A method of accomplishing this result may be through the provision of a construction similar to that illustrated in Fig. 11. In this construction the valve seat 82 for the inlet ball check valve 52 is located at the side of the chamber 50 and slightly above its lowermost point 83. Between the point 83 and the valve seat 82 the chamber 50 has its lowermost surface arranged in a slope 84 so that the ball valve 52 may roll to the point 83 when the pump is idle. When this construction is used, the upward movement of the pump piston 43 draws the fluid into the chamber 50 through the inlet passage 51. Then, upon a subsequent lowering of the piston 43, the pressure within the chamber 50 is raised and fluid is exhausted through the inlet passage 51 and the discharge passage 54. However, the pressure conditions and the flow of fluid almost instantaneously cause the ball check valve 52 to move from the point 83 up the slope 84 and to become seated in its seat 82, and all of the fluid is expelled out the discharge passage 54.

Changes may be made in the form, construction, and arrangement of the parts without departing from the spirit of the invention or sacrificing any of its advantages, and the right is hereby reserved to make all such changes as fairly fall within the scope of the following claims.

The invention is hereby claimed as follows:

1. A fluid dispenser embodying a pedestal, a reservoir for fluid at the top of said pedestal, a pump in said reservoir, said pump embodying a discharge conduit, a discharge spout for the pump adjustable to several discharge positions in a horizontal plane about a vertical axis, means for operating the pump, and means on the spout and on the discharge conduit movable out of co-operating relation for releasing the spout for relative adjustment with relation to the conduit, and into co-operating relation for maintaining the spout in any of its adjusted positions.

2. In a liquid dispenser having an outlet pipe member, a discharge spout member selectively adjustable on said pipe member to any one of several discharging positions in a horizontal plane about a vertical axis, interengaging means comprising detents on one member, and detent notches on the other for maintaining said discharge spout in any one of several discharging positions, said discharge spout being bodily movable in a direction lengthwise of the outlet pipe member, to seat and unseat said detent with respect to said notches.

3. In a liquid dispenser having a pedestal, a pedal carried by said pedestal, a column mounted on said pedestal, a reservoir mounted on said column, a vertical tube open at both ends, the lower end of which opens into the interior of the column and the upper end of which opens into the interior of the reservoir, a pump barrel in said reservoir and a pump piston within said pump barrel, means for operating said pump piston, said means comprising a crank pivotally mounted adjacent the upper ends of said vertical tube and said pump barrel, a rigid reciprocable member extending through said vertical tube and through said column, one end of said member being operatively connected to one side of said crank and the other being operatively connected with said pedal, a rigid reciprocable link extending from said pump barrel, one end of said link being connected to the other side of said crank and the other being operatively connected with said pump piston, and resilient means located exteriorly of the reservoir and operatively connected with said pump piston, said means being adapted to urge said pump piston in one direction.

4. In a liquid dispenser having a pedestal, a pedal carried by said pedestal, a column mounted on said pedestal, a reservoir mounted on said column, a vertical tube open at both ends, the lower end of which tube opens into the interior of the column and the upper end of which tube opens into the interior of the reservoir, a pump barrel in said reservoir and a pump piston within said pump barrel, means for operating said pump piston comprising a pivoted member mounted adjacent the upper ends of said vertical tube and said pump barrel, means engaging and connecting said pivoted member with said pump piston and through said vertical tube and column with said pedal whereby to move said pump piston in one direction by pressing the pedal, and resilient means yieldingly urging said pump piston in the opposite direction.

5. In a liquid dispenser having a pedestal, a pedal carried by said pedestal, a column mounted on said pedestal, a reservoir mounted on said column, a vertical tube open at both ends, the lower end of which tube opens into the interior of the column and the upper end of which tube opens into the interior of the reservoir, a pump barrel in said reservoir and a pump piston within said pump barrel, means for operating said pump piston comprising a pulley pivotally mounted adjacent the upper ends of said vertical tube and said pump barrel, traction means extending through said vertical tube and column and operatively connected with said pedal, said traction means having a flexible portion riding on said pulley and connected with said pump piston whereby to move the same in said barrel in one direction in response to actuation of the pedal, and spring means urging said piston in the opposite direction in said barrel.

6. A liquid dispenser embodying a discharge tube and a discharge spout connected therewith and adjustable with respect thereto, to one of several predetermined positions in a horizontal plane about a vertical axis, said tube and nozzle being provided, one with a pin and the other with recesses to receive said pin for maintaining said spout in any one of the selected positions.

7. A liquid dispenser embodying a base, a hollow standard supported thereby, a container carried by the standard, a hollow extension on the standard projecting into and terminating short of the top of the container, a pump barrel within said container and having communication therewith, valve mechanism for controlling said communication, a discharge outlet conduit communicating with the pump and extending to the outside of said container, a discharge nozzle, said pump embodying a piston, a manually operable member mounted upon said base, means operatively connecting said member with said pump piston, through said standard and the extension thereof, and a pivotally mounted element adjacent the end of said extension, which element co-operates with the last said means in the actuation of the pump piston by the said manual means.

8. A liquid dispenser embodying a base, a hollow standard supported thereby, a container carried by the standard, a hollow extension on the standard projecting into and terminating short of the top of the container, a pump barrel within said container and having communication therewith, valve mechanism for controlling said communication, a discharge outlet conduit communicating with the pump and extending to the outside of said container, a discharge nozzle, means connecting said nozzle to said conduit for adjustment into different positions with respect thereto, means for maintaining the nozzle in each of its adjusted positions, said pump embodying a piston, a manually operable member mounted upon said base, means operatively connecting said member with said pump piston, through said standard and the extension thereof, and a pivotally mounted element adjacent the end of said extension, which element co-operates with the last said means in the actuation of the pump piston by the said manual means.

9. A liquid dispenser embodying a base, a hollow standard supported thereby, a container carried by the standard, a hollow extension on the standard projecting into and terminating short of the top of the container, a pump barrel within said container and having communication therewith, valve mechanism for controlling said communication, a discharge outlet conduit communicating with the pump and extending to the outside of said container, a discharge nozzle, said pump embodying a piston, a manually operable member mounted upon said base, means operatively connecting said member with said pump piston, through said standard and the extension thereof, a pivotally mounted element adjacent the end of said extension, which element co-operates with the last said means in the actuation of the pump piston by the said manual means, and means other than the said manual means for moving the pump piston in one direction and against the stress of which last said means the piston is operated by the said manual means.

10. A liquid dispenser embodying a base, a hollow standard supported thereby, a container carried by the standard, a hollow extension on the standard projecting into and terminating short of the top of the container, a pump barrel within said container and having communication therewith, valve mechanism for controlling said communication, a discharge outlet conduit communicating with the pump and extending to the outside of said container, a discharge nozzle, said pump embodying a piston, a manually operable member mounted upon said base, means operatively connecting said member with said pump piston, through said standard and the extension thereof, a pivotally mounted element adjacent the end of said extension, which element co-operates with the last said means in the actuation of the pump piston by the said manual means, means connecting said nozzle to said conduit for adjustment into different positions with respect thereto, and means embodying interlocking portions between the nozzle and conduit, movable into and out of interlocking engagement for maintaining the nozzle in each of its adjusted positions.

11. A liquid dispenser embodying a base, a hollow standard supported thereby, a container carried by the standard, a hollow extension on the standard projecting into and terminating short of the top of the container, a pump barrel within said container and having communication therewith, valve mechanism for controlling said communication, a discharge outlet conduit communicating with the pump and extending to the outside of said container, a discharge nozzle extending radially from said conduit and container, means connecting said nozzle to said conduit for adjustment with respect thereto and to said container, means for maintaining the nozzle in each of its adjusted positions, said pump embodying a piston, a manually operable member mounted upon said base, means operatively connecting said member with said pump piston, through said standard and the extension thereof, and a pivotally mounted element adjacent the end of said extension, which element co-operates with the last said means in the actuation of the pump piston by the said manual means.

SCOTT M. ABBOTT.

REFERENCES CITED

The following references are of record in the file of this patent:

UNITED STATES PATENTS

| Number | Name | Date |
|---|---|---|
| 173,444 | Chapman | Feb. 15, 1876 |
| 1,713,517 | Boe | May 21, 1929 |
| 1,607,855 | Winkley | Nov. 23, 1926 |
| 716,087 | Nicolay | Dec. 16, 1902 |
| 1,916,394 | Spring | July 4, 1933 |
| 1,061,099 | Miller | May 6, 1913 |
| 1,947,086 | Hillyard | Feb. 13, 1934 |